United States Patent [19]
Denio et al.

[11] Patent Number: 5,638,424
[45] Date of Patent: Jun. 10, 1997

[54] TELEPHONE VOICE MAIL DELIVERY SYSTEM

[75] Inventors: Michael A. Denio, Sugarland; James G. Littleton, Houston, both of Tex.

[73] Assignee: Texas Instruments Incorporated, Dallas, Tex.

[21] Appl. No.: 610,079

[22] Filed: Feb. 29, 1996

Related U.S. Application Data

[63] Continuation of Ser. No. 347,540, Nov. 30, 1994, abandoned.

[51] Int. Cl.⁶ .................................................. H04M 1/64
[52] U.S. Cl. .......................... 379/67; 379/89; 379/92; 379/93; 379/95
[58] Field of Search .......................... 379/67, 88, 89, 379/94, 100, 95, 201, 92, 386, 93

[56] References Cited

U.S. PATENT DOCUMENTS

| | | | |
|---|---|---|---|
| 4,922,521 | 5/1990 | Krikke et al. | 379/95 |
| 4,941,168 | 7/1990 | Kelly, Jr. | 379/88 |
| 5,023,903 | 6/1991 | Bowen | 379/67 |
| 5,040,209 | 8/1991 | Greenberg et al. | 379/94 |
| 5,048,076 | 9/1991 | Maurer et al. | 379/94 |
| 5,056,132 | 10/1991 | Coleman et al. | 379/95 |
| 5,062,133 | 10/1991 | Melrose | 379/94 |
| 5,086,458 | 2/1992 | Bowen | 379/386 |
| 5,164,981 | 11/1992 | Mitchell et al. | 379/88 |
| 5,179,585 | 1/1993 | MacMillan, Jr. et al. | 379/89 |
| 5,202,915 | 4/1993 | Nishii | 379/100 |
| 5,241,587 | 8/1993 | Horton et al. | 379/92 |
| 5,268,957 | 12/1993 | Albrecht | 379/88 |
| 5,301,228 | 4/1994 | Kakigi et al. | 379/100 |
| 5,329,578 | 7/1994 | Brennan et al. | 379/67 |
| 5,329,583 | 7/1994 | Jurgensen et al. | 379/266 |
| 5,335,276 | 8/1994 | Thompson et al. | 380/21 |
| 5,371,787 | 12/1994 | Hamilton | 379/92 |
| 5,404,400 | 4/1995 | Hamilton | 379/92 |
| 5,471,522 | 11/1995 | Sells et al. | 379/100 |
| 5,487,105 | 1/1996 | Sakai | 379/100 |

OTHER PUBLICATIONS

Texas Instruments 1992, Texas Instruments MWave Office Pro Product Bulletin, SRT102.

*Primary Examiner*—Thomas W. Brown
*Assistant Examiner*—Scott Wolinsky
*Attorney, Agent, or Firm*—W. Daniel Swayze, Jr.; W. James Brady, III; Richard L. Donaldson

[57] ABSTRACT

Apparatus and a method are disclosed for establishing communication between a sending system and a receiving system. Upon initiation of the communication, the sending system sequentially monitors the receiving system for a response from one of a human interface, a non-cooperating system or a cooperating system. If a response from a human interface within the receiving system is received by the sending system, the sending system transmits a message to a human. If a response is not received from a human interface but is received from a non-cooperating system within the receiving system, the sending system transmits a message to an answering machine. If a response is not received from a human interface or a non-cooperating system, but is received from a cooperating system within the receiving system, information is exchanged between the sending system and the cooperating system in an attempt to establish communication.

15 Claims, 3 Drawing Sheets

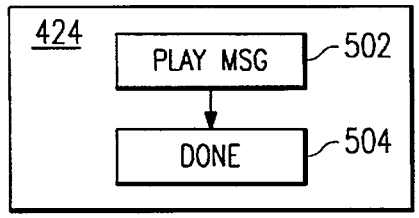
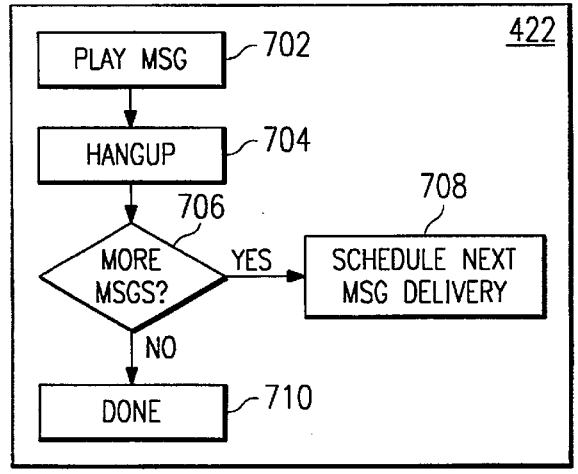
FIG. 5
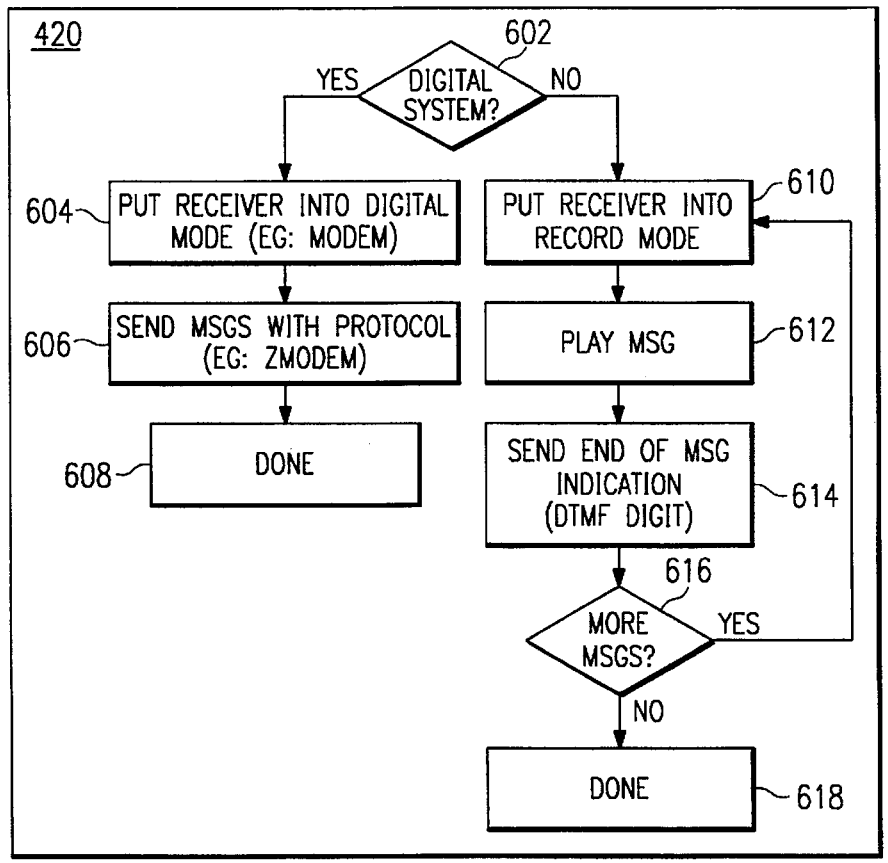
FIG. 3
FIG. 4

TELEPHONE VOICE MAIL DELIVERY SYSTEM

This application is a Continuation, of application Ser. No. 08/347,540 filed on Nov. 30, 1994, now abandoned.

TECHNICAL FIELD OF THE INVENTION

This invention relates to a communication system and more particularly to methods and systems for voice message systems.

BACKGROUND OF THE INVENTION

Voice message systems, and the like have become common modes of communication among business persons and consumers alike. Typically, a business organization will have a PBX direct a caller's telephone call to an appropriate extension within the organization. If the connection is not completed, the call is forwarded to a voice mail system wherein the caller may leave a message in a "mailbox" having an address corresponding to the extension called.

However, a problem with these types of systems is that in order to leave a telephone message or respond to a telephone message, it is required that the recipient access those messages with the same voice mail system as the sender or that the sender manually make telephone calls and dictate the message. Also, typically, when a message has been left for recipient using the telephone, the sender is not allowed to edit a message once it has been recorded and must redial the telephone and must recite the message repeatedly.

Furthermore, the prior art systems have been unable to overcome the limitation that the same type of voice mail system must be used.

Furthermore, these voice mail systems do not provide an interface for user with the exception of a menu of phone key to press. Most voice mail systems are limited in that voice messages cannot be delivered outside of the local voice mail system.

SUMMARY OF THE INVENTION

The present invention provides a voice mail system that may send voice mail messages to targeted recipients which include humans, uncooperating voice mail systems, (for example telephone answering systems) and cooperating voice mail systems.

The present invention distinguishes between different type of systems.

The present invention does not require that the recipient be of the same voice mail system and does not require that the recipient voice mail system be cooperating. Thus, the present invention provides a method and apparatus for recipients of a different type of voice mail system to receive voice messages or voice mail from senders. Thus, a recipient system of a cooperating system can receive voice messages. In this way, a voice mail system can be made cooperating so that it can communicate with other types of voice mail systems.

The present invention identifies cooperating systems and transfers data to that cooperating system.

The present invention provides for multiple transactions with both cooperating and non-cooperating systems.

Furthermore, the present invention includes a switch in the receiving or recipient system so that the receiving system can be switched into a data mode, allowing the transfer of data into a database.

The present invention includes an apparatus for communication, including a sending system for initiating the communication, a receiving system for establishing the communication with the sending system, the sending system detecting if the receiving system includes a cooperating system and establishing communication with the cooperating system, wherein the sending system detects the cooperating system by detecting the absence of a human interface and an uncooperating system. The sending system receives information sufficient so that cooperating system may communicate with the sending system. The sending system receives protocol information to communicate with the cooperating system. Further the sending system schedules the communication for a predetermined future time if the communication cannot be established. The uncooperating system may be an answering machine. The cooperating system is operable to switch between an audio mode to store audio messages or a digital mode to store digital data.

DESCRIPTION OF THE DRAWINGS

FIG. 3 illustrates an additional flowchart of the present invention;

FIG. 4 illustrates a further flowchart of the present invention; and

FIG. 5 illustrates a further flowchart of the present invention.

DETAILED DESCRIPTION OF THE INVENTION

Figure 1:
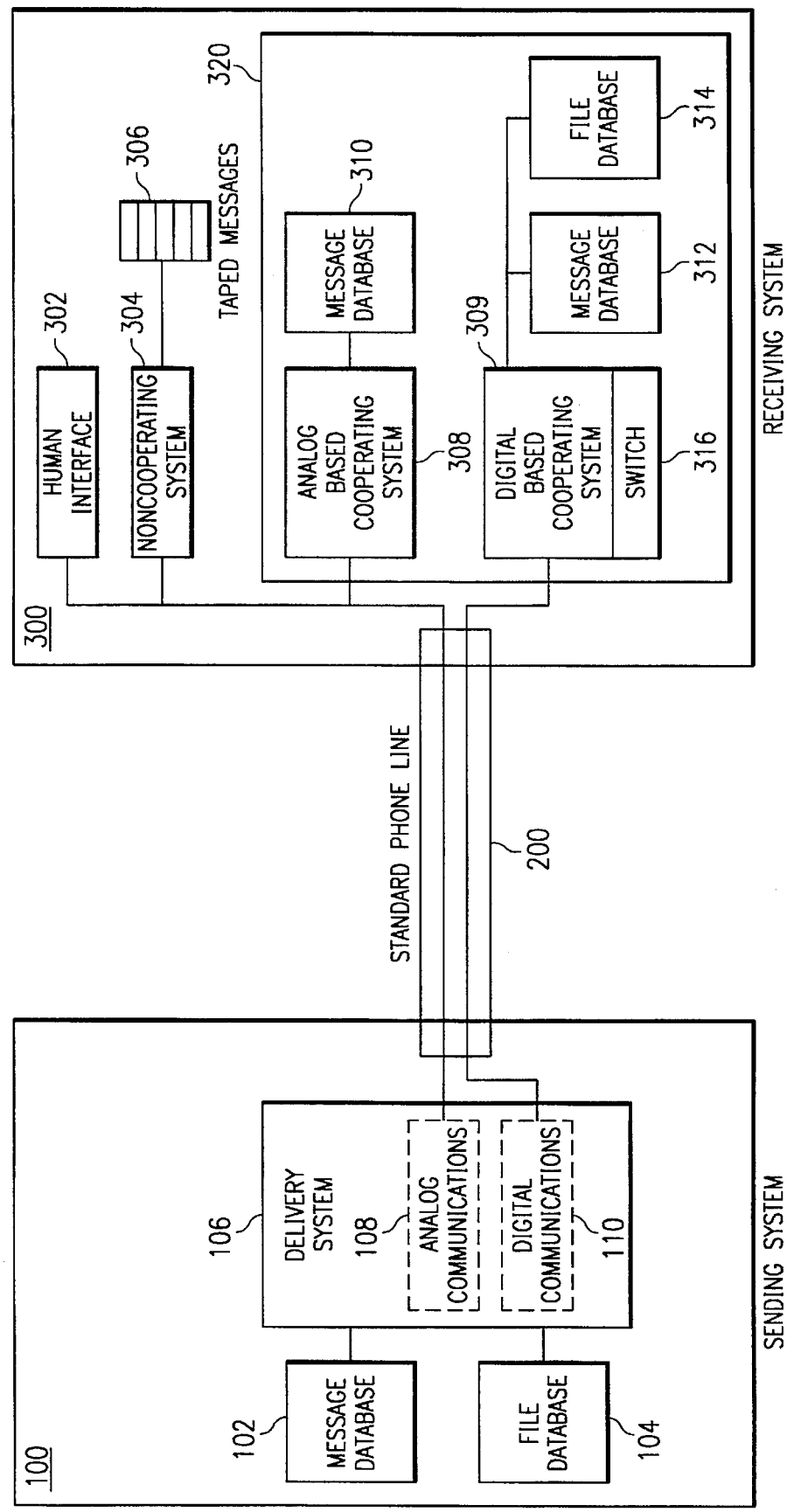
FIG. 1 illustrates a sending and receiving system of the present invention.

FIG. 1 illustrates that the sending system 100, which may be a computer or personal computer, is coupled to the receiving system 300, for example through a communication line 200, for example a phone line. It is to be understood that the coupling between sending system 100 and receiving system 300 may be a wire, infrared, fiberglass, or microwave coupling. The sending system 100 includes a message database 102 that includes typically audio messages which are to be sent to the receiving system. The sending system 100 also includes a delivery system 106 comprising an analog communications module 108 and a digital communications module 110. The audio messages may be stored in digital format and converted to analog format to be transmitted along the communication line 200 via the analog communications module 108 which converts the digital data in the message database 102 to analog and then transmits the now analog data along the communications line 200 to the receiving station 300.

The sending system 100 additionally includes file database 104 that includes digital data, for example fax data. The digital data in the file database 104 is transmitted to the receiving system 300 through the communication line 200.

The receiving system 300 includes a human interface 302, for example a telephone to connect the sending system 100 with the user. Furthermore, the receiving system may include a non-cooperating system 304, for example an answering machine to record messages on a tape 306. The receiving system 300 includes a cooperating system 320. The cooperating system 320 may have both an analog based cooperating system 308 and a digital based cooperating system 309 or only one of these. The cooperating system 320 may be the same system as the sending system 100, or may be a different type of system such that the cooperating system 320 may receive instructions from the sending system 100, such as protocol or handshake information sufficient so that the cooperating system 320 may communicate with the sending system 100. While the receiving system 300 illustrates the human interface 302, the non-cooperating system 304 and the cooperating system 320, it is not necessary that all of these be actually present in the receiving system. Any combination of these may be present while others may be deleted. If the sending system 100 first dials the receiving system, and no answer is received by the sending system 100; the sending system 100 presumes that the receiving system 300 is unable to answer the call at the present time, and another communication is scheduled for a later time using a long predetermined time interval. If the sending system 100 receives a busy signal from the receiving system 300, the sending system 100 presumes that the receiving system 300 can answer the communication when the communication line 200 is free. The communication is scheduled for delivery at a later time using a predetermined short time interval. When the receiving system 300 determines that a call has been answered, the sending system 100 determines whether a human has answered the human interface 302, a non-cooperating system 304 has answered a phone or a cooperating system 320 has answered the phone. The sending system 100 transmits an audio message from message database 102 to the receiving system to determine if DTMF for touchstone is received, for example an audio message is sent stating "Hello, this is Gary, I have a message for you, press # if you would like to receive it." If a human has activated the human interface 302 of the receiving system, for example by picking up the receiver of a telephone after the message is heard by the user, the user may press # in response. The sending system 100 recognizes this, the DTMF #, and transmits an audio message from message database 102 to the user through human interface 302. During the predetermined period of time that the sending system 100 is waiting for a response from the receiving system 300, if no human voice is received from human interface 302, but instead, one of two different tones distinguished by different frequencies may be received by the sending system 100. One tone may be generated by the non-cooperating system 304, for example an answering machine may produce a monotone signalling that recording may begin to the sending system 100.

The sending system 100 recognizes this monotone as a non-cooperating system and transmits an audio message from message database 102 through analog communications 108 to be recorded by the non-cooperating system 304 on tape 306. If a tone indicative of the cooperating system 320, for example a DTMF tone is transmitted by the receiving system 300 and received by the sending system 100, the sending system 100 detects the cooperating system 320, and the sending system 100 transmits an additional verifying tone, for example a # key or * key to the cooperating system 320 to initiate a handshake with the cooperating system 320. For example, the cooperating system 320 will send information to the sending system 100, for example the number of messages to be delivered to the cooperating system 320, the mailbox ID in the file database 314 and the phone number of the sending system 100. The cooperating system 320 will send additional information to the sending system 100. This information includes whether just digital or analog information may be received by the cooperating system 320 or both. Both types of data may be received by the cooperating system 320. The cooperating system 320 then transmits a signal to indicate that the cooperating system 320 is able to receive the data from the sending system 100. The sending system 100 will then transmit a command to the receiving system 320 to switch to a record mode to receive data from the sending system 100. The switch 316 switches the digital cooperating system to the proper mode to store data in the message database 312 or the file database 314. The sending system 100 will transmit the first message to the cooperating system 320. After this message has been received by the cooperating system 320 and stored either in the message database 312 or the file database 314. The cooperating system 320 will send a ready key signal to indicate to the sending system 100 that another command may be received by the cooperating system 320. One such command is that, after all the messages have been transmitted to the cooperative system 320, a message can be transmitted to the cooperating system 320 from the sending system 100 to instruct the cooperating system 320 to transmit to the sending system 100 any messages from the cooperating system 320 that may be in the message database 312 or the file database 314. Consequently, the sending system 100 is switched from sending messages to the receiving system 300 to receive the messages from the cooperative system 320. Alternatively, the switch 316 may be transferred into a data mode such that files containing digital information including error checking protocols such as z-modem and information including pictures, videos and faxes can be transferred to the cooperating system 320. Additionally, audio messages can be transferred in the form of digital information avoiding the degradation of the signal that results from the analog conversion and the reconversion into digital.

Figure 2:
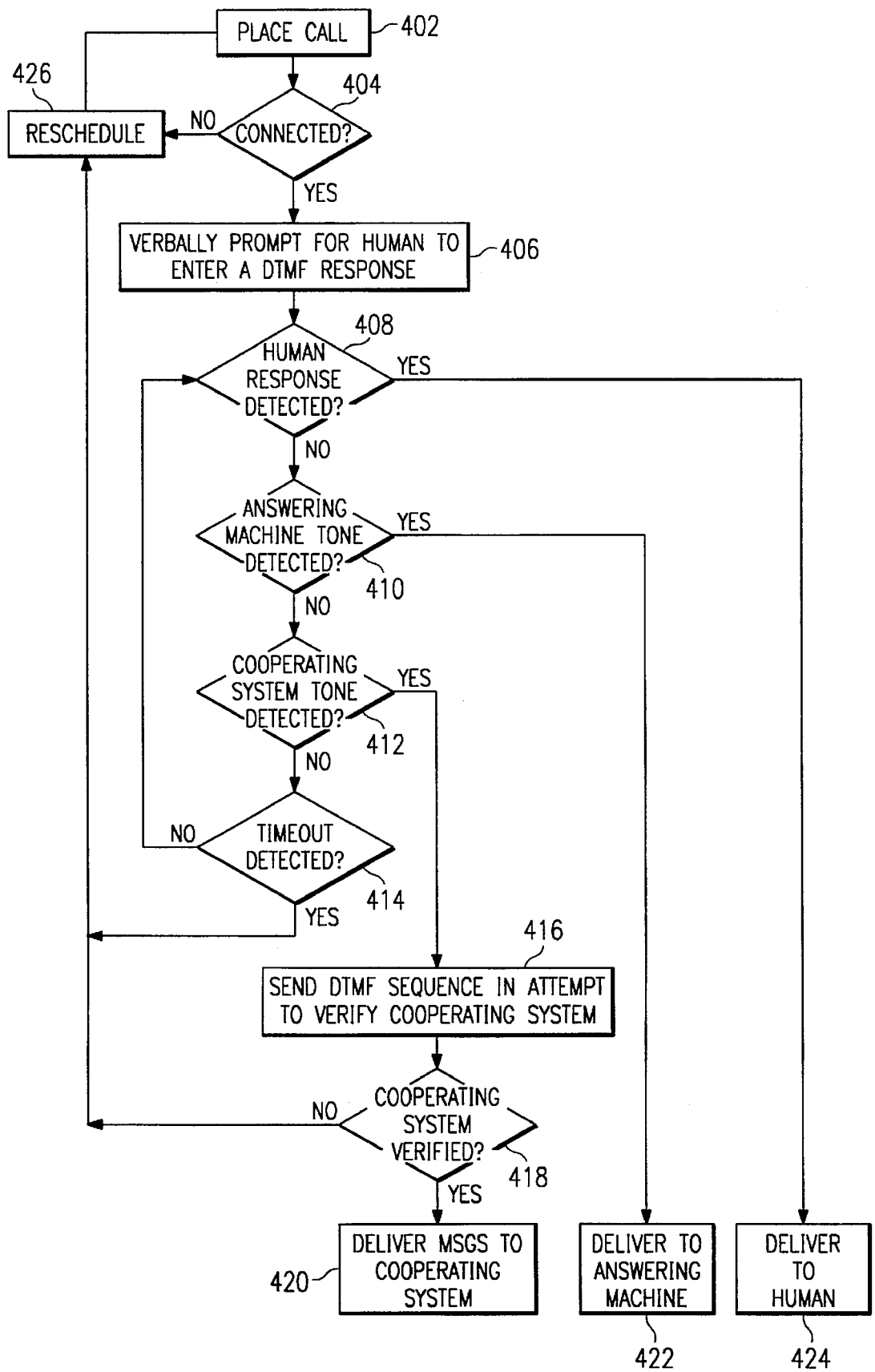
FIG. 2 illustrates a flowchart of the present invention.

FIG. 2 illustrates a flowchart of the present invention. In block 402, the sending system 100 places a call to the receiving system 300. In block 404, the sending system 100 detects if a connection has been established with the receiving system 300. If no connection has been made, the communication is rescheduled in block 426. If the connection is made, in block 406, an audio prompt for a user to enter a DTMF response is made. In block 408, the sending system attempts to detect a human response. If the sending system 100 detects a human response in block 408, a message is delivered to a human in block 4 through human interface 302. If not then block 410 is executed. In block 410, the sending system detects if an answering machine monotone is detected. If the answering machine monotone is detected in block 410, the message is delivered to the answering machine in block 422. If not then block 412 is executed. In block 412, the sending system 100 determines if the cooperating system tone is detected. If not and if a timeout has not been detected in block 414, control is transferred to block 408. If a timeout has been detected in block 414, the communication is rescheduled in block 426. If the cooperating system 320 is detected, the sending system 100 sends a DTMF sequence to verify a cooperating system in block 416. In block 418, if the cooperating system is verified, in block 420, the messages are delivered to the cooperating system. If the cooperating system is not verified in block 418, control is transferred to block 426.

FIG. 3 illustrates that the sending system 100 plays the messages in block 502 to the human through the human interface 302 and in block 504 ends.

As illustrated in FIG. 4, in block 602, if a digital system is detected, the cooperating system 320 is placed into a digital mode, for example a modem is connected to the communication line 200 in block 604. In block 606 messages are sent with protocol, for example z-modem and in block 608 the process is ended. If a digital system is not detected in step 602, the receiver is put into a record mode in block 610. The message is played by the sending system in block 612, and the cooperating system 320 sends the end of message indication in block 614. If more messages are to be sent in block 616, control passes to block 610. If there are no more messages, control passes to block 618 and stops.

In FIG. 5, the sending system 100 plays the message which is recorded by the non-cooperating system 304 on tape 306 in block 702. In block 704, the sending system hangs up the line. In block 706, the sending system decides if more messages are to be sent. If yes, in block 708, more messages are scheduled for delivery, if not, the sending system exits in block 710.

Other Embodiments

Although the present invention and its advantages have been described in detail, it should be understood that various changes, substitutions and alterations can be made herein without departing from the spirit and scope of the invention as defined by the appended claims.

What is claimed is:

1. An apparatus for communication, comprising:

a sending system for initiating said communication; and a receiving system for establishing said communication with said sending system, said receiving system including:
 (a) a human interface via which a human can indicate to said sending system a desire to receive a message from said sending system;
 (b) a non-cooperating system capable of indicating to said sending system that said non-cooperating system is available to record a message to be sent from said sending system; and
 (c) a cooperating system capable of indicating to said sending system that said cooperating system is available for verification by said sending system, said cooperating system having different message recording modes that can be selected by said sending system upon successful completion of said verification;

wherein said sending system determines whether said receiving system includes a cooperating system after attempting but failing to detect a response from said human interface and then from said non-cooperating system.

2. An apparatus for communication as in claim 1, wherein if said sending system determines that said receiving system includes a cooperating system, said sending system establishes communication with said cooperating system.

3. An apparatus for communication as in claim 2, wherein said sending system sends information to said cooperating system so that said cooperating system may communicate with said sending system.

4. An apparatus for communication as in claim 3, wherein said sending system sends messages with protocol information to said cooperating system.

5. An apparatus for communication as in claim 4, wherein said cooperating system is switchable between an audio mode to store audio messages and a digital mode to store digital data.

6. An apparatus for communication as in claim 1, wherein said sending system schedules said communication for a predetermined time if said communication can not be currently established.

7. An apparatus for communication as in claim 1, wherein said non-cooperating system is an answering machine.

8. A method for communication, comprising the steps of:

initiating communication from a sending system;

establishing said communication with a receiving system, said receiving system including:
 (a) a human interface via which a human can indicate to said sending system a desire to receive a message from said sending system;
 (b) a non-cooperating system capable of indicating to said sending system that said non-cooperating system is available to record a message to be sent from said sending system; and
 (c) a cooperating system capable of indicating to said sending system that said cooperating system is available for verification by said sending system, said cooperating system having different message recording modes that can be selected by said sending system upon successful completion of said verification;

attempting to detect a response from said human interface;

if no response to said attempt to detect a response from said human interface is received, attempting to detect a response from said non-cooperating system; and if no response to said attempt to detect a response from said non-cooperating system is received, said sending system determining whether said receiving system includes a cooperating system.

9. A method for communication as in claim 8, wherein said method further comprises the step of said sending system establishing communication with said cooperating system if said sending system determines that said receiving system includes a cooperating system.

10. A method for communication as in claim 9, wherein said method further comprises the step of said sending system sending information to said cooperating system so that said cooperating system may communicate with said sending system.

11. A method for communication as in claim 10, wherein said method further comprises the step of said sending system sending messages with protocol information to said cooperating system.

12. A method for communication as in claim 11, wherein said method further comprises the step of said cooperating system switching between an audio mode to store audio messages and a digital mode to store digital data.

13. A method for communication as in claim 8, wherein said method further comprises the step of scheduling said communication for a predetermined time if said communication can not be currently established.

14. A method for communication as in claim 8, wherein said method further comprises the step of said sending system distinguishing between a response received from said cooperating system and a response received from said non-cooperating system.

15. A method for communication as in claim 8, wherein said non-cooperating system is an answering machine.

* * * * *